Dec. 27, 1955    C. B. DE VLIEG    2,728,242
HYDRAULIC CONTROL APPARATUS
Filed Aug. 20, 1952    6 Sheets-Sheet 1

Inventor
Charles B. De Vlieg
By McCanna & Morsbach
Attys.

Dec. 27, 1955     C. B. DE VLIEG     2,728,242
HYDRAULIC CONTROL APPARATUS
Filed Aug. 20, 1952     6 Sheets-Sheet 5

Inventor
Charles B. DeVlieg
By McCanna & Morsbach
Attys.

United States Patent Office

2,728,242
Patented Dec. 27, 1955

2,728,242

HYDRAULIC CONTROL APPARATUS

Charles B. De Vlieg, Farmington, Mich.

Application August 20, 1952, Serial No. 305,387

17 Claims. (Cl. 74—364)

This invention relates to hydraulic control apparatus adapted for various applications. The invention has more particular reference to the application of an hydraulic control for change-speed mechanism whereby any of a given range of speeds may be produced in response to a speed selection setting. For purpose of illustration the invention is herein disclosed as applied to a machine tool. In this respect the invention contemplates as a general object the provision of novel hydraulic control apparatus for selectively controlling a variable speed drive, and has particular reference to such a control apparatus for controlling the speed of the spindle drive in a horizontal boring and milling machine.

Another object of this invention is to provide a novel hydraulic control apparatus which is capable of selectively controlling the drive through a variable speed transmission to establish any one of a number of possible speed settings.

It is also an object of this invention to provide a valve of novel construction for simultaneously controlling the flows to and from a plurality of hydraulic devices in an hydraulic control apparatus.

Another object of this invention is to provide an hydraulic control apparatus which includes a novel unitary assembly of hydraulic cylinders and reciprocable pistons in which movement of any one of the pistons to its operative position causes the other pistons in the assembly to be locked automatically in their inoperative positions.

A further object of this invention is to provide an hydraulic control apparatus for a variable speed drive which includes a novel manually controlled arrangement which is selectively operable to control the connection of the drive to the driven element.

A still further object of this invention is to provide an hydraulic control apparatus for a variable speed drive which includes a novel speed selector valve for hydraulically controlling the speed of the drive and a novel manually operated arrangement for controlling the connection of the variable speed drive to the driven element.

Yet another object of this invention is to provide a novel hydraulic control apparatus for selectively setting a variable speed drive for any one of sixteen different operating speeds by means of hydraulic mechanisms for shifting a plurality of clutch members in the variable speed drive.

My invention further contemplates as one of its objects the provision of an improved construction having novel characteristics of the kind hereinabove recited adapted for application as a whole or in its several components to machine tools and to other uses wherever such controls may be useful.

My invention further contemplates the provision of hydraulic control apparatus characterized by its comparatively simple construction considering the functions performed, by the adaptability of such construction for economical manufacture, and by the practicability of such construction for its intended applications.

Other and further objects and advantages of the present invention will be apparent from the following description of a preferred embodiment thereof, which is shown in the accompanying drawings to illustrate the principles and mode of operation of the invention.

In furtherance of the objects prefaced above I have illustrated the invention as applied in a machine tool. This illustrative embodiment includes the following main features, which will be described in detail: a variable speed transmission from a driving motor to the spindle of a machine tool, this transmission including six shiftable clutches for producing any one of sixteen speed drives to the spindle; six hydraulic cylinders and shifting forks operated thereby for controlling the individual shiftable clutches; a speed selector valve for selectively controlling the flow of oil to and from the hydraulic cylinders for effecting the appropriate shifting of the shifting forks to establish the desired drive through the transmission for the particular speed setting of the valve; and a manually controlled mechanism, including a main control valve, for selectively establishing or disconnecting the drive from the transmission to the spindle and for controlling the energization of the driving motor for the transmission.

It will be understood, however, that the invention is not limited to this specific application of speed changes. The invention contemplates application to other speed-change combinations and arrangements of the several components as will be appreciated by those skilled in this art.

*Transmission*

Referring to the drawings, the control apparatus of the present invention is shown in conjunction with a variable speed transmission for driving the spindle of a machine tool of the type used for horizontal boring and milling operations. This variable speed transmission may desirably be of the type disclosed in my co-pending application Serial No. 305,386, filed August 20, 1952. However, the control apparatus is not to be construed as limited in its utility to this particular application.

Figure 10:
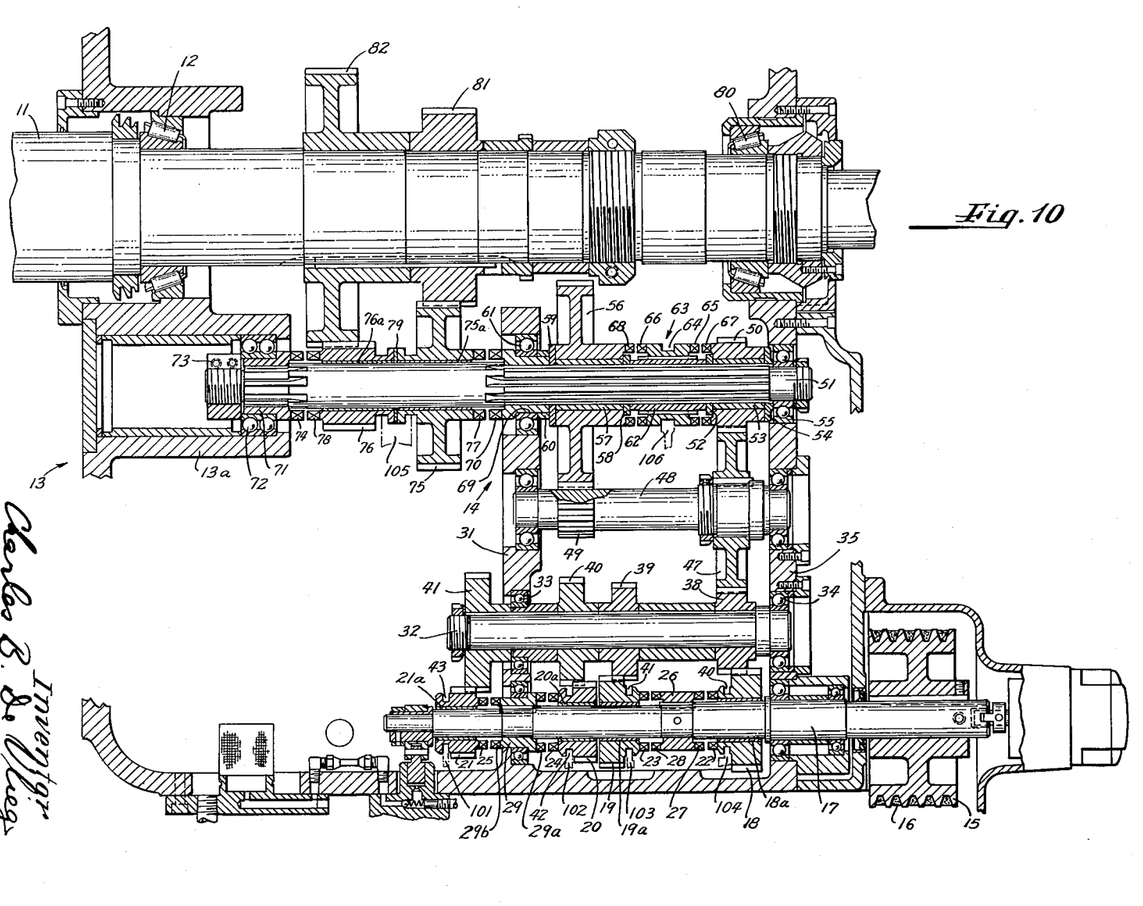
Figure 10 is a longitudinal section through a variable speed transmission which is controlled by the hydraulic control apparatus of the present invention.

As seen in Figure 10, the spindle 11 of the machine tool is mounted for rotation at the roller bearings 12 and 80 to rotate relative to the casing 13. A variable speed transmission, indicated generally at 14, forms the driving connection between the spindle and a suitable driving source, such as a suitable electric motor (not shown) for rotating the spindle at the desired speed. The input drive to the transmission from the driving motor is through a belt and pulley drive 15, 16 from the motor. The pulley 15 is keyed to the input shaft 17 for driving the latter at a predetermined speed governed by the speed of the driving motor. The input driving shaft 17 is suitably journaled for rotation in the casing 13 and supports four axially shiftable gears, which are rotatably mounted on shaft 17. The shiftable gears 18, 19, 20 and 21 are mounted on bearing bushings 18a, 19a, 20a, and 21a, which are slidable along drive shaft 17. The axial positions of the gears 18—21 along shaft 17 are controlled by shifting forks 104, 103, 102 and 101, respectively, which are under the control of the hydraulic control apparatus of the present invention, as explained in detail hereinafter. Formed integral with the shiftable gears 18—21 are the axially offset face clutch members 22, 23, 24 and 25, respectively. Between the gear-clutch unit 18, 22 and the gear-clutch unit 19—23 there is provided a clutch member 26 which is fixed to the drive shaft 17 and which is formed at its opposite ends with sets of clutch teeth 27, 28 adapted to mesh respectively with the clutch 22 and the clutch 23. A similar clutch member 29 is fixed to the drive shaft 17 between the gear-clutch unit 20—24 and the gear-clutch unit 21—25 and is formed at its opposite ends with clutch faces 29a and 29b adapted to mesh with the clutches 24 and 25, respectively. The gear-clutch units 18—22, 19—23, 20—24, and 21—25, are formed with reduced neck portions 40, 41, 42 and 43, respectively, for receiving the shifting forks 101—104. These gear-clutch units are shiftable axially along shaft 17 into and out of engagement with the clutch members 26 and 29, for selectively establishing a drive from shaft 17 to one of the gear-clutch units. In Figure 10 each of these gear-clutch units is shown in its neutral or idling position, disconnected from driving relation with the drive shaft 17. Ball bearings 30 are interposed between the clutch member 29 and an upstanding casing wall 31 to support the clutch member 29 and the shaft 17 for rotation.

An intermediate driven shaft 32 is rotatably supported by bearings 33 and 34, positioned respectively at the upstanding casing wall 31 and another upstanding casing wall 35 disposed toward the rear end of the casing. This shaft 32 carries four fixed gears 36, 37, 38 and 39, which are positioned to mesh respectively with the gears 18, 19, 20 and 21 on the drive shaft 17.

When the gear-clutch unit 18—22 on drive shaft 17 is in its idling position it meshes with the gear 38 on the intermediate shaft 32 across only part of the width of the gear teeth, but these gears are never completely disengaged. When the gear-clutch unit 18—22 is shifted to the left in Figure 10, its clutch 22 moves into mesh with the adjacent complementary clutch teeth 27 on the clutch member 26 and its gear teeth move into full mesh with the gear teeth on gear 38. This establishes a drive from shaft 17 through clutch member 26, gear clutch unit 18—22 and gear 38 to the intermediate shaft 32. In like manner, the other gear-clutch units 19—23, 20—24, and 21—25 on the drive shaft 17 in their respective idling positions mesh with the adjacent gear 39, 40 or 41 on intermediate shaft 32 across only part of the width of the gear teeth, but these gears are never completely out of mesh. The gear clutch unit 19—23 may be shifted to the right along drive shaft 17 to bring its clutch 23 into engagement with the complementary clutch teeth 28 on the clutch member 26 and to bring its gear teeth into mesh across the full width of gear 39, in order to establish a second speed drive from the drive shaft 17 through clutch member 26, gear-clutch unit 19—23 and gear 39 to the intermediate shaft 32.

Similarly, the gear-clutch units 20—24 and 21—25 are respectively continually in mesh with the gears 40 and 41 on the intermediate shaft 32 and are adapted to be shifted selectively into clutching engagement with the clutch member 29 for establishing the third and fourth speed increments of the drive from the input drive shaft 17 to the intermediate shaft 32.

Obviously, since the gear sets are of different sizes, the choice of the particular gear-clutch unit 18—22, or 19—23, or 20—24, or 21—25 which is to be driven from the drive shaft 17 determines the speed at which the intermediate shaft 32 is driven. The gear sets are proportioned such that the lowest drive speed to the intermediate shaft 32 is established through the gear-clutch unit 21—25, the next higher speed is through the gear-clutch unit 20—24, a still higher speed is established through the gear-clutch unit 18—22.

The gear 38 carried on the intermediate shaft 32 meshes with a large gear 47 keyed to an idler shaft 48. The idler shaft 48 is suitably journaled for rotation between the casing walls 31 and 35. A smaller gear 49 is attached to the idler shaft adjacent the casing wall 31.

The large idler gear 47 meshes with a gear 50 which is rotatably mounted on a bearing bushing 53 on shaft 51. Gear 50 is fixed axially along shaft 51 by means of a collar 52, abutting against one end of gear 50 and bearing bushing 53, and the end thrust collar 54, which is disposed in abutting relation between the other end of gear 50 and a ball bearing assembly 55, positioned in the upstanding casing wall 35 to support the shaft 51 for rotation.

The small gear 49 on the idler shaft 48 meshes with a second gear 56 carried on the shaft 51. Gear 56 is rotatably mounted on a bearing bushing 57 on shaft 51. The second gear 56 is fixed axially along shaft 51 by means of a collar 58, which abuts against one end of gear 56 and the bushing 57, and an end thrust collar 59, which is interposed between the other end of gear 56 and a tubular fitting 60, which abuts against a ball bearing assembly 61 carried in the intermediate upstanding casing wall 31.

A cylindrical bearing bushing 62 located between the end thrust collars 52 and 58 is mounted on shaft 51. On its outer surface the bushing 62 is splined longitudinally and a clutch member 63 is keyed thereto to be slidable axially along the bushing 62 and to rotate in unison therewith. The shiftable clutch member 63 is formed with a reduced neck 64 to receive a shifting fork 106, which is controlled by the hydraulic control apparatus of the present invention in the manner described in detail in the following description. At its opposite ends the clutch member 63 is formed with sets of clutch teeth 65 and 66 adapted respectively to engage complementary clutch teeth 67 and 68 formed integral with the respective gears 50 and 56 at the inner axial ends thereof.

Figure 10 shows the clutch member 63 in its neutral position, with there being no driving connection from the idler shaft 48 to the splined shaft 51. When the clutch member 63 is shifted axially to the right in Figure 10 its clutch teeth 65 interlock with the clutch teeth 67 attached to gear 50, to thereby establish a driving connection from idler shaft 48 through the gears 47 and 50 and clutch 63 to the splined shaft 51. Alternatively, when the clutch member 63 is shifted axially to the left in Figure 10 its clutch teeth 66 interlock with the clutch teeth 68 attached to gear 56, to thereby establish a driving connection from idler shaft 48 through the gears 49 and 56 and clutch 63 to the splined shaft 51. Thus, clutch 63 provides a pair of increments of speed change in the drive to splined shaft 51, so that with the already described mechanism in the transmission it is possible to drive the splined shaft 51 at any one of eight different speeds from the input drive shaft 17. Obviously, the higher speed increment in the drive to splined shaft 51 would be through the larger gear 47 on the idler shaft 48.

At the intermediate upstanding casing wall 31 a clutch member 69 is splined to shaft 51 to rotate therewith and is supported for rotation by means of ball bearings 61. At one end the clutch member 69 extends snugly through the tubular fitting 60 and is formed with a flat annular end face abutting against the thrust collar 59. At its other end the clutch member 69 is formed with an enlarged head having a plurality of axial clutch teeth 70.

The forward end of the splined shaft 51 is journaled in a sleeve 13a, which is an integral part of the casing 13. A clutch member 71 is keyed to this forward end of shaft 51 for rotation therewith, a ball bearing assembly 72 being located between this clutch member and the casing sleeve 13a. A lock nut 73 abuts against one end of clutch member 71. At its opposite inner end the clutch member 71 carries a plurality of clutch teeth 74.

Between these fixed clutch members 69 and 71 the shaft 51 is formed with a smooth peripheral surface. Separate gear members 75 and 76 are mounted on separate bearing bushings 75a and 76a at this smooth portion of shaft 51 to be rotatable about shaft 51 independent of one another. A flat annular collar 79 is located between the adjacent inner ends of the gear members 75 and 76 and the collars 75a and 76a. Gear member 75 at its outer end carries a clutch face having clutch teeth 77 adapted to interlock with the clutch teeth 70 on the clutch member 69. The other gear member 76 at its outer end carries a clutch face having clutch teeth 78 adapted to interlock with the clutch teeth 74 on the clutch member 71. While the gear members 75 and 76 are journaled on shaft 51 independent of one another, their respective axial positions along shaft 51 are controlled unitarily by the same shifting fork 105.

Figure 10 illustrates the neutral position of the gear members 75 and 76 axially along shaft 51, at which position these gear members idle on the shaft. When shifted to the right in Figure 10, the clutch teeth 77 on gear member 75 are moved into interlocking relation with the clutch teeth 70 on the clutch member 69, which rotates with shaft 51, to thereby establish a driving connection from shaft 51 to gear 75. In this extreme axial position of the gear member 75 the other gear member 76 is maintained out of engagement with clutch 71. When shifted to the left in Figure 10, the clutch teeth 78 on gear member 76 are moved into interlocking engagement with the clutch teeth 74 on the clutch member 71, to thereby establish a drive from shaft 51 to gear 76. Thus, the gears 75 and 76 may alternately and selectively be driven by shaft 51.

The spindle 11 of the machine tool is suitably mounted for rotation by the spaced roller bearing assemblies 12, positioned adjacent the forward end of casing 13, and 80, located at the rear of the casing. Rigidly mounted on the spindle 11 are a first gear 81, which is positioned to mesh with gear 75, and a second gear 82, which is positioned to mesh with gear 76. In all axial positions of the shiftable gears 75 and 76 they are in mesh with the corresponding spindle gears 81 and 82 across at least a portion of their respective gear teeth.

Obviously, the speed at which the spindle 11 rotates is determined by which of the gears 75 and 76 is being driven from shaft 51, as well as by the previously described drive to shaft 51. Thus, a total of sixteen different spindle speeds are possible in this transmission, depending upon the positions of the shifting forks 101—106.

*Hydraulic cylinder arrangement for controlling shiftable clutches in the transmission*

Figure 5:
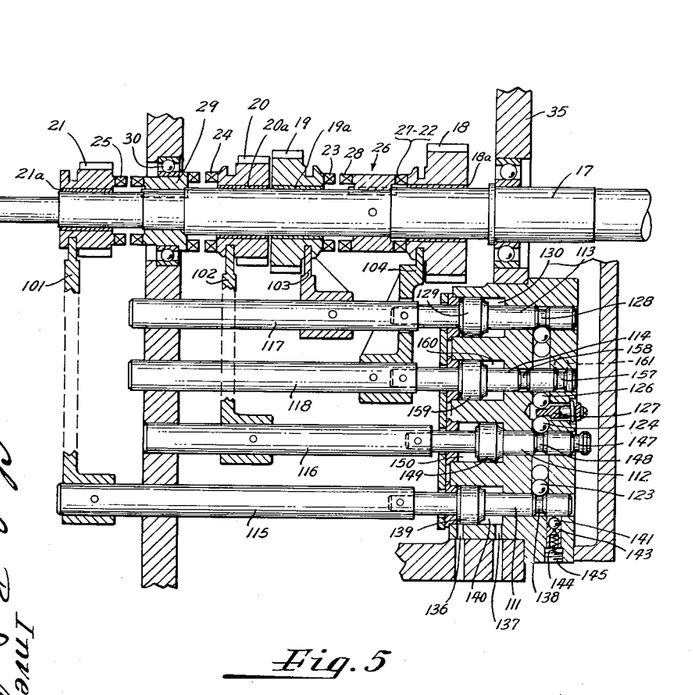
Figure 5 is a view illustrating schematically unitary hydraulic cylinder assembly which is controlled by the speed selector valve of Figures 2-4, this shifter being spread out in one plane to illustrate more clearly the principles of its operation by means of this schematic presentation without exactly representing its actual physical arrangement.
Figure 6:
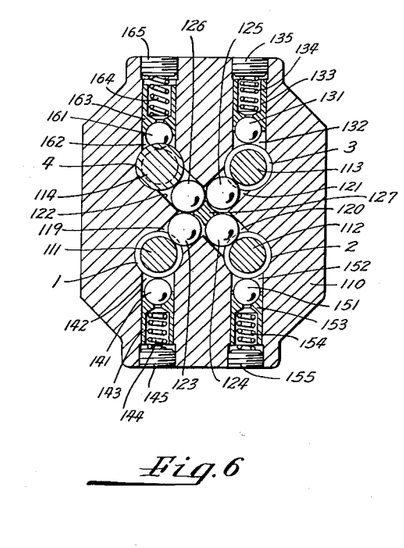
Figure 6 is a transverse cross-sectional view showing the actual physical arrangement of the unitary hydraulic cylinder assembly in the Figure 5 assembly.

For controlling the positions of the shifting forks 101, 102, 103 and 104 there is provided the unitary hydraulic cylinder assembly shown in Figures 5 and 6. This cylinder assembly includes a casing 110 formed with four cylinder passages 1, 2, 3, 4 in which are slidable the reciprocating pistons 111, 112, 113 and 114, respectively. These pistons are attached respectively to reciprocatory rods 115, 116, 117 and 118, respectively, which carry the shifting forks 101, 102, 103 and 104, respectively. Thus, the axial positions of the pistons 111—114 determine the respective positions of the shiftable gear clutch units 18—22, 19—23, 20—24, and 21—25 in the variable speed transmission.

As best seen in Figure 6, the cylinder casing 110 is formed with four transverse intersecting passages 119, 120, 121 and 122 which extend toward one another away from the respective cylinder passages 1, 2, 3 and 4. At the intersection of the transverse passages 119—122 there is provided an assembly of four balls 123, 124, 125 and 126, which extend respectively into the transverse passages 119, 120, 121 and 122, and a floating spacer member 127 located between these balls. At their outer ends away from the spacer member 127 the balls 123—126 bear against the adjacent surfaces of the respective pistons 111, 112, 113 and 114 in the cylinder passages 1, 2, 3 and 4 (see Figure 6).

From Figure 6 it will be seen that the piston 113 is formed with a reduced neck portion 128 which the ball 125 is operable to engage in one axial position of this piston. Piston 113 is also formed with an enlarged piston head 129 which operates in a fluid pressure chamber 130 in the casing 110. Suitable fluid pressure passages communicate with opposite ends of the chamber 130 for passing oil to and from these opposite ends of the chamber 130. When oil under pressure is supplied to the right end of the chamber 130, the ball 125 is received in the reduced neck portion 128 of piston 113, as shown in Figure 5, for locking the piston in this position. When oil under pressure is supplied to the left end of the chamber 130, the piston 113 is displaced axially to the right. A spring-pressed ball 131 (Figure 6), which is located in the cylinder housing 110 axially to the right of the intersecting transverse passages 119—122, then drops into the reduced neck portion 128 of the piston 113 to releasably lock the piston in this extreme axial position. From Figure 6 it will be seen that the spring-pressed ball 131 operates in a vertical passage 132 which extends above cylinder passage 3. A reciprocatory plunger 133, which at its lower end provides a hemispherical seat for the ball 131, is biased downwardly by a compression coil spring 134, which at its upper end is engaged by a screw 135 threaded into the upper end of the passage 132. The force of spring 134 is such that it may be overcome by fluid pressure at the right side of piston head 129, for disengaging the piston 113 from the releasable interlock at its extreme right position.

In like manner, the piston 111, which operates in cylinder passage 1, is formed with a reduced neck portion 138 which the ball 123 is operable to engage when the piston 111 is in its extreme axial position to the left (Figure 5). Piston 111 is formed with an enlarged piston head 139 which operates in a fluid pressure chamber 140 in the cylinder block 110. Fluid pressure passages 136 and 137 communicate with opposite ends of the chamber 140 for passing oil to and from these opposite ends of the chamber. When oil under pressure is supplied through passage 137 to the right end of the chamber 140, the piston 111 is positioned to locate its reduced neck portion 138 to receive the ball 123 for locking the piston 111 in its extreme left position. When oil under pressure is supplied through passage 136 to the left end of chamber 140, the piston 111 is displaced axially to the right. A spring-pressed ball 141, located in the cylinder block 110 axially to the right of the intersecting transverse passages 119—122, then seats in the reduced neck portion 138 of the piston 111 to releasably lock the piston 111 in its extreme right position. The spring-pressed ball 141 is seated in a reciprocatory plunger 143, which operates in a vertical passage 142 extending below cylinder passage 1. A compression coil spring 144 acts between the plunger 143 and a screw 145 threaded into the lower end of passage 142 to bias the ball 141 toward the cylinder passage 1. Fluid pressure at the right side of piston head 139 is operative to overcome the force of spring 144 to disengage piston 111 from the releasable interlock at its extreme right position.

The piston 112, which operates in cylinder passage 2, is formed with spaced reduced neck portions 147 and 148. Piston 112 is also provided with an enlarged piston head 149 which operates in a fluid pressure chamber 150 in the cylinder block 110. Suitable fluid pressure passages communicate with opposite ends of the chamber 150 for passing oil to and from these opposite ends of the chamber. When oil under pressure is supplied to the left end of chamber 150, the piston 112 is positioned to the right to locate its reduced neck portion 148 to receive the ball 124, for locking piston 112 in its extreme right position. When oil under pressure is supplied to the right end of chamber 150, the piston 112 is displaced axially to the left. A spring-pressed ball 151, located in the cylinder block 110 axially to the right of the intersecting transverse passages 119—122, then seats in the reduced neck portion 147 of piston 112 to releasably lock the piston 112 in its extreme left position. The spring-pressed ball 151 is seated in a reciprocatory plunger 153, which operates in a vertical passage 152 extending below cylinder passage 2. A compression coil spring 154 acts between the plunger 153 and a screw 155 threadedly received in the lower end of passage 152 to bias the ball 151 toward the cylinder passage 2. When fluid pressure is applied against the left side of piston head 149, the force of spring 154 is overcome and piston 112 is shifted to the right to be disengaged from the releasable interlock at the spring-pressed ball 151.

The piston 114, which operates in cylinder passage 4, is formed with spaced reduced neck portions 157 and 158. Piston 114 is also provided with an enlarged piston head 159 which operates in a fluid pressure chamber 160 in the cylinder block 110. Suitable fluid pressure passages communicate with opposite ends of the chamber 160 for passing oil to and from these opposite ends of the chamber. When oil under pressure is supplied to the left end of chamber 160, the piston 114 is positioned to the right to locate its reduced neck portion 158 to receive the ball 126, for releasably locking piston 114 in its extreme right position. When oil under pressure is supplied to the right end of chamber 160, the piston 114 is displaced axially to the left. A spring-pressed ball 162, located in the cylinder block 110 axially to the right of the intersecting transverse passages 119—122, then seats in the reduced neck portion 157 of piston 114 to releasably lock the piston 114 in its extreme left position. The spring-pressed ball 161 is seated in a reciprocatory plunger 163, which operates in a vertical passage 162 extending above cylinder passage 4. A compression coil spring 164 acts between the plunger 163 and a screw 165 threaded into the upper end of passage 162 to bias the ball 161 toward the cylinder passage 4. Fluid pressure against the left side of piston head 159 is operative to overcome the force of spring 164 for disengaging piston 114 from the releasable interlock at spring-pressed ball 161 and for shifting piston 114 to the right.

The above-described arrangement of the pistons and balls in the cylinder block is such that only one at a time of the shiftable gear-clutch units 18—22, or 19—23, or 20—24, or 21—25 may be shifted into clutch with the drive shaft 17.

Thus, as shown in Figure 5, when the piston 114 in cylinder passage 4 is shifted to the left it shifts the gear-clutch unit 18—22 into clutch with the clutch member 26 carried by drive shaft 17. In this position, piston 114 forces the adjacent ball 126 inwardly along the transverse cylinder block passage 122. Ball 126 in turn acts against the floating spacer member 127 to push each of the other balls 123, 124 and 125 outwardly in the respective transverse cylinder block passages 119, 120 and 121 to project into the respective piston passages 1, 2 and 3 in the cylinder block 110. These balls 123, 124 and 125 are therefore wedged into locking engagement with the reduced neck portions 138, 148 and 128 of the respective pistons 111, 112 and 113 to lock these pistons against axial movement until the inward pressure on the ball 126 is released by shifting piston 114 to its opposite extreme axial position, to disengage the associated gear-clutch unit 18—22 from driving relation with the input drive shaft 17.

In like manner, when any one of the other pistons is shifted axially to move its associated gear-clutch unit into clutching engagement with the drive shaft 17, the other pistons will be locked in their respective neutral positions by the described ball arrangement.

For controlling the position of the shifting fork 106 (Figure 3) there is provided an hydraulic mechanism which includes a reciprocatory piston 170 which carries an enlarged piston head 171 operating in a chamber 172 in the cylinder 6. Fluid pressure passages 173 and 174 communicate respectively with opposite ends of the chamber 172 from controlling the flow of oil to and from the opposite ends of the chamber. Piston 170 is also formed with spaced reduced neck portions 175 and 176. A spring-pressed ball arrangement, consisting of a ball 177 seated in a reciprocatory plunger 178, which operates in a vertical passage 179 and which is biased downwardly toward piston 170 by a compression coil spring 180, is adapted to engage either of the reduced neck portions on piston 170 to releasably lock the piston in either of its extreme axial positions.

When oil under pressure is supplied through passage 173 to the left end of chamber 172, the piston 170 is positioned in its extreme right position and spring-pressed ball 177 is received in the reduced neck portion 175 on piston 170 to releasably lock the piston in this position. At this position of piston 170, the shifting fork 106 has shifted the shiftable clutch member 63 to the right to bring its clutch teeth 65 into mesh with the clutch teeth 67 on gear 50, to establish a drive from idler shaft 48 through gears 47 and 50 and clutch member 63 to shaft 51.

When oil under pressure is supplied through passage 174 to the right end of chamber 172, the piston 170 is positioned in its extreme left position and spring-pressed ball 177 is received in the reduced neck portion 176 on piston 170 to releasably lock the piston in this position. At this position of piston 170, the shifting fork 106 has shifted the shiftable clutch member 63 to the left along shaft 51 to bring its clutch teeth 66 into engagement with the clutch teeth 68 on gear 56, to establish a drive from idler shaft 48 through gears 49 and 56 and clutch member 63 to shaft 51.

*Manually controlled mechanism, including main control valve, for controlling connection of transmission to spindle and for controlling energization of driving motor*

For controlling the position of the shifting fork 105 (Figure 3) there is provided an hydraulic mechanism, including the cylinder 5 and a reciprocable piston rod 181, and a manually operable rotary valve 182. Piston rod 181 is attached to the shifting fork 105. Main control valve 182 is a rotary valve and at its inner end carries a pair of lugs 183 and 184, which are adapted respectively to engage lugs 186 and 185 on the shifting fork 105. While the reciprocatory piston rod 181 is operable to move the shifting fork 105 between its extreme axial positions, in either of these extreme axial positions of the shifting fork a cooperating pair of lugs on the shifting fork 105 and rotary valve 182 are suitably located such that by turning the rotary valve 182 counterclockwise one quarter turn a lug on the rotary valve 182 engages a cooperating lug on the shifting fork 105 to shift the latter to its neutral position.

Figures 1, 2:
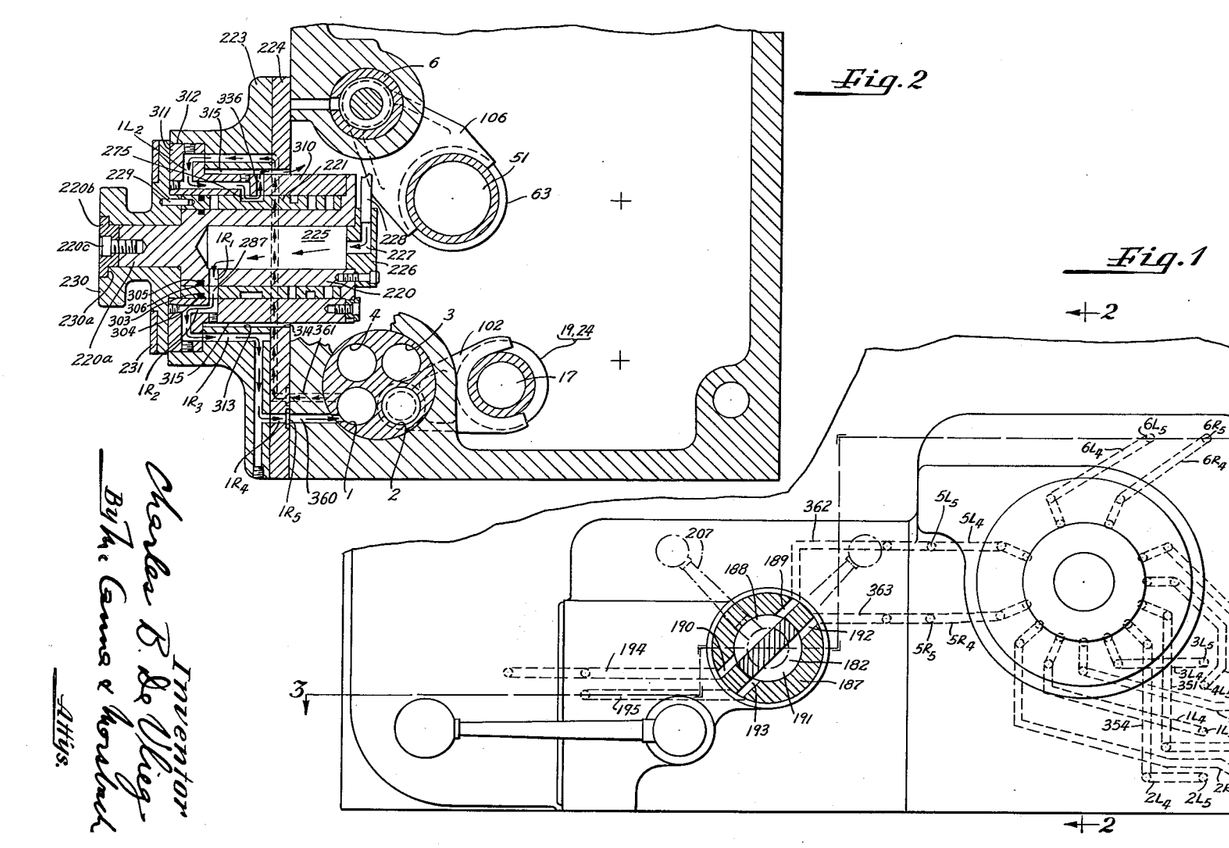
Figure 1 is a front view, with parts broken away, showing the control valve portions of the present hydraulic control apparatus.
Figure 2 is a section taken along the line 2—2 in Figure 1 and showing schematically in simplified fashion the flows of oil through the speed selector valve to one of the hydraulic cylinders in the control apparatus of the present invention.
Figures 3, 4:
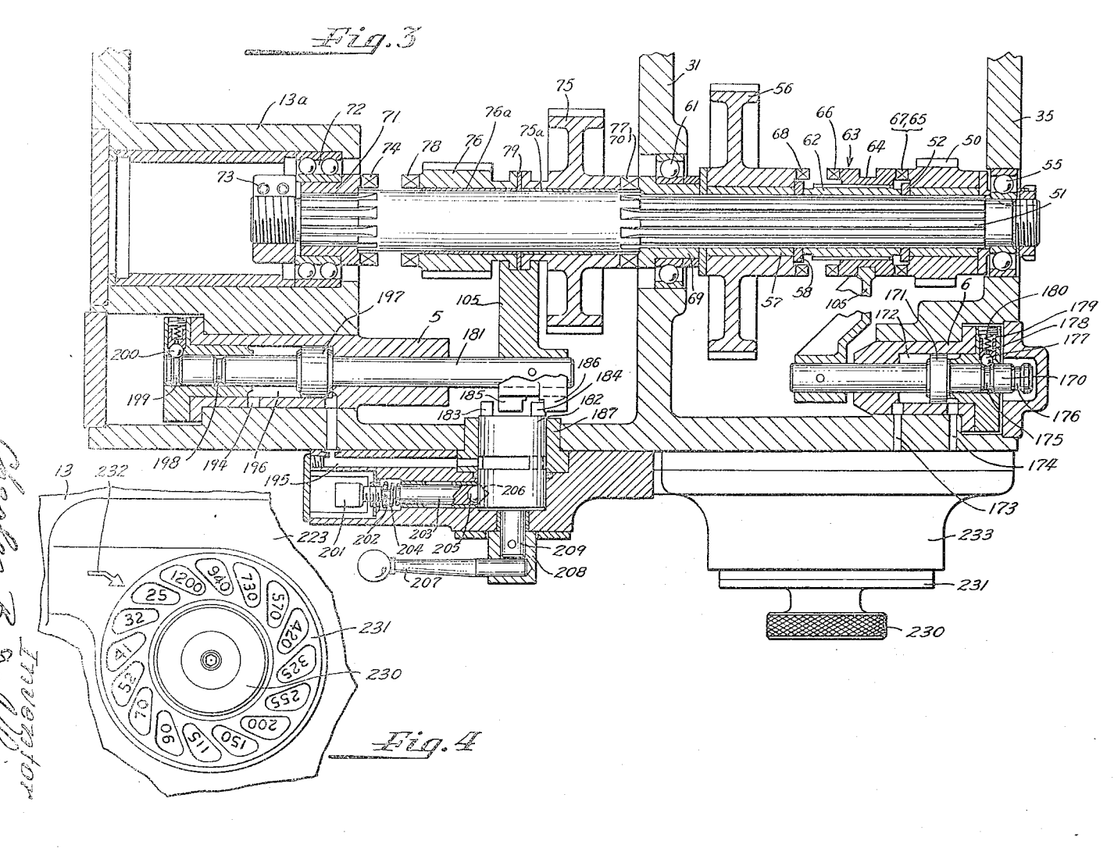
Figure 3 is a section taken along the line 3—3 in Figure 1.
Figure 4 is a front view of the speed selector valve in the present hydraulic control apparatus.

As seen in Figures 1 and 3, the main control rotary valve 182 operates in a valve body 187 of generally cylindrical configuration. The valve 182 is formed with a first cut-away peripheral passage 188, which is operable in one angular position of the valve to effect communication between spaced passages 189 and 190 in the valve body (Figure 1). Valve 182 at its opposite side is formed with another cut-away peripheral passage 191, which is operable in that angular position of the valve to effect communication between spaced passages 192 and 193 in the valve body. In this angular position of the rotary valve 182 oil is permitted to flow through this valve to and from the passages 194 and 195 which lead to opposite ends of a fluid pressure chamber 196 in cylinder 5.

However, when the rotary valve 182 is turned angularly clockwise in Fig. 1, it blocks communication between the valve body passages 189 and 190, and 192 and 193, as well as moving the shifting fork 105 in the described manner to position the gear members 75 and 76 in their neutral positions. There is provided a lost motion arrangement at the lugs 183, 186, and 184, 185 so that before the respective pair of lugs engage, the valve 182 will have been turned a predetermined amount from its extreme position. Thus, when the valve 182 is turned clockwise in Fig. 1, the passage 191 in this valve effects communication between the stationary valve body passages 190 and 193 leading to opposite ends of the passage 196 of cylinder 5 before the lug 183 attached to rotary valve 182 engages the lug 186 for shifting the shifting fork 105 to neutral position. This permits oil from one end of this cylinder passage to be exhausted through the valve to the opposite end of the piston as the piston 197 is shifted in response to the described turning of valve 182. In this manner, the oil pressure at the cylinder 5 does not oppose the manual turning of valve 182 by the operator of the machine for shifting the shifting fork 105 to neutral.

An enlarged piston 197 attached to the piston rod 181 is positioned to reciprocate in the fluid pressure chamber 196, so that when oil under pressure is supplied through rotary valve 182 to the left end of fluid pressure chamber 196 the piston is shifted to the right to shift the clutch teeth 77 on gear 75 into engagement with the clutch teeth 70 on clutch 69, and when oil under pressure is supplied to the right end of fluid pressure chamber 196 the piston is moved to the left to shift the clutch teeth 78 on gear 76 into engagement with the clutch teeth 74 on clutch member 71. The piston rod 181 is formed with a pair of spaced reduced neck portions 198 and 199, which are adapted respectively to be engaged by a spring-pressed ball 200 for releasably locking the piston rod 181 in either of its extreme axial positions.

In addition to controlling the flow of oil to and from the fluid pressure chamber 196 for piston 197, the rotary valve 182 also controls the energization of the driving motor for the spindle 11 in the following manner: A normally closed switch 201 (Fig. 3) in the energization circuit for the driving motor is adapted to be closed when its operating button 202 is depressed. A reciprocatory plunger 203 which engages operating button 202 is normally biased by compression coil spring 204 outwardly away from the operating button 202. At its outer end plunger 203 carries a ball 205. The rotary valve 182 is formed with a peripheral recess 206 in which the ball 205 seats when the valve is in its position for passing oil to and from the pressure chamber 196 for piston 197, so that in this position of valve 182 the switch 201 is in its normal closed position. However, when the rotary valve is turned clockwise, to move the shifting fork 105 to its neutral position and to shut off fluid pressure communication with the fluid pressure chamber 196 for piston 197, the ball 205 is pushed inwardly by the unrecessed periphery of the rotary valve 182 to push plunger 203 inwardly against the force of spring 204 to depress the operating button 202 and open switch 201, thus de-energizing the driving motor for the spindle. Thus, when the rotary valve 182 is positioned in its extreme clockwise position to position shifting fork 105 in its neutral position and thereby disconnect the drive to the spindle 11, the driving motor for the spindle is also automatically de-energized.

For controlling the angular position of the rotary valve 182 there is provided the manually operable lever 207 (Figure 3) which is attached to a thimble shaped hub 208, which is keyed to a shaft 209 on which valve 182 is mounted.

While the operation of the shifting fork 105 and the rotary valve 182 should be readily apparent from the foregoing description, their operation will be briefly outlined. When rotary valve 182 is in its extreme clockwise position the driving motor for the spindle is de-energized and the shifting fork 105 is in its neutral position to disconnect the drive from shaft 51 to the spindle 11. When rotary valve 182 is turned counter-clockwise to its opposite extreme position it thereby permits the switch 201 to close and energize the driving motor for the spindle. In addition, the rotary valve in this position establishes flows through itself to and from the fluid pressure chamber 196 for piston 197, so that the piston rod 181 and shifting fork 105 may be shifted either to the left or right depending upon the oil flows as determined by the external hydraulic control circuit, which is described in detail hereinafter. Thus, depending upon the external hydraulic control circuit, the shifting fork 105 is shifted to the right to establish a drive from shaft 51 through clutch member 69 and gear members 75 and 81 to the spindle 11, or the shifting fork 105 is shifted to the left to establish a drive from shaft 51 through clutch member 71 and gear members 76 and 82 to the spindle 11.

*Speed selector valve*

Figure 7:
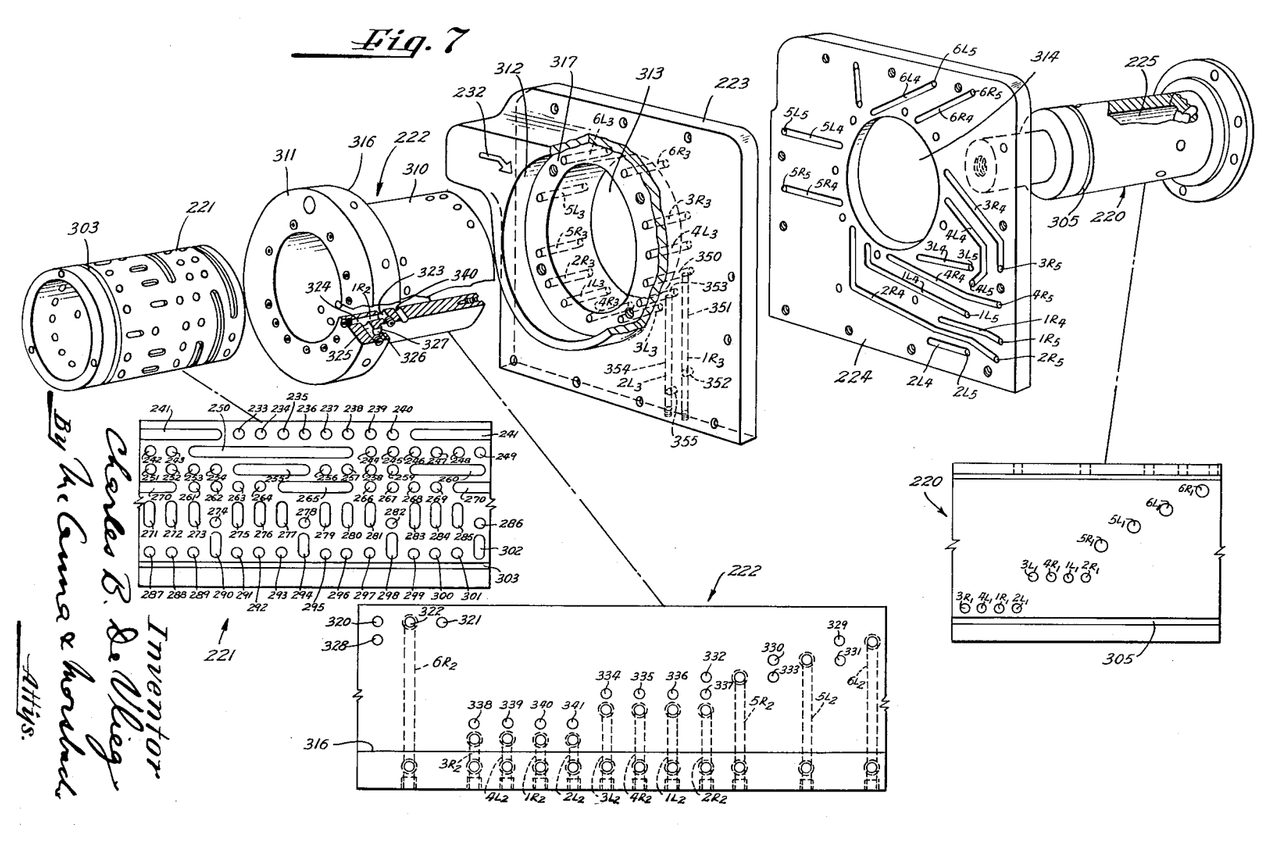
Figure 7 is an exploded perspective view of the speed selector valve of Figures 2-4, and additionally showing developments of certain of the parts of this valve.

For controlling the oil flows to and from the pressure chambers of the cylinders 1, 2, 3, 4, 5 and 6, there is provided the speed selector valve shown in exploded perspective in Figure 7. In general, this valve assembly includes the stationary inner valve sleeve 220, the adjustable valve sleeve 221 which snugly surrounds the stationary inner valve sleeve 220, the stationary valve body 222 which snugly surrounds the movable valve sleeve 221, the stationary end plate 223 provided with passages communicating with passages in the valve body 222, and the stationary manifold 224 provided with passages communicating with the passages in the end plate 223 and with the passages leading to the opposite ends of the fluid pressure chambers for the respective cylinders 1—6.

*Stationary inner valve sleeve*

Referring to Fig. 2, in which the various parts of the speed selector valve are shown in assembled relation, the stationary inner valve sleeve 220 is formed with a central axially extending inlet pressure chamber 225. A pressure inlet cap 226 closes the inner end of the pressure chamber 225 and is formed with an oil inlet passage 227, which receive oil under pressure through a tube 228 from a suitable source (not shown), such as a pump. The stationary inner valve sleeve 220 is also formed with a plurality of pressure outlet passages leading from its inlet pressure chamber 225. The respective positions of these outlet passages axially along the inner valve sleeve 220 and angularly about the cylindrical circumferences of this inner valve sleeve are shown in the development of this valve member (Fig. 7). Adjacent its inner end, the inner valve sleeve 220 is formed with a passage $6R_1$, which is adapted to pass oil under pressure from the inlet pressure chamber 225 to the right end of the piston chamber in cylinder 6. Another passage 6L₁ is formed in the inner valve sleeve 220 in spaced relation from the passage 6R₁ toward the outer end of the inner valve sleeve and angularly about the valve sleeve; this passage is operable to pass oil under pressure from the inlet pressure chamber 225 to the left end of the piston chamber in cylinder 6 in certain positions of the other ports. In like manner, the stationary inner valve sleeve 220 is formed with the passages 5L₁, 5R₁, 2R₁, 1L₁, 4R₁, 3L₁, 2L₁, 1R₁, 4L₁, and 3R₁ (located as shown in the development in Fig. 7) for passing oil under pressure from the inlet pressure chamber 225 to the appropriate end of the correspondingly numbered cylinder. Toward its outer end, the fixed inner valve sleeve 220 is formed with an annual groove 305 in which a sealing ring 306 is located (Fig. 2).

Adjustable valve sleeve

The adjustable valve sleeve 221 is of cylindrical configuration and snugly surrounds the stationary inner valve sleeve 220. The adjustable valve sleeve 221 has sixteen operative positions angularly about the stationary inner valve sleeve 220 for establishing selectively any one of the sixteen spindle speeds. From Fig. 2 it will be seen that the adjustable valve sleeve 221 is attached by dowel pins 229 to a manually operated knob 230, which extends around the reduced stem portion 220a at the outer end of the fixed inner valve sleeve 220. A flange head 220b is attached by a screw 220c to the outer axial end of the fixed inner valve sleeve 220 and has its flange received within an annular recess 230a in the outer axial face of knob 230 to properly located the inner valve sleeve 220 axially with respect to the adjustable valve sleeve 221. The operating knob carries an indicia plate 231 indicating the spindle speed in revolutions per minute for the particular angular setting of the adjustable valve sleeve 221, a fixed index pointer 232 being provided on the adjacent front face of the end plate 223 for cooperation with the indicia plate on the operating knob 230 to indicate the speed setting.

As best seen in the development of the adjustable valve sleeve 221 shown in Fig. 7, this valve sleeve is formed adjacent its inner end with a first row of passages positioned to communicate selectively with the passage 6R₁ in the stationary inner valve sleeve 220. This row of passages includes eight evenly-spaced passages 233—240 extending radially through the valve sleeve 221, each of which communicates with the passage 6R₁ in the fixed inner sleeve 220 in a particular angular setting of the movable valve sleeve 221. This first row of passages in the adjustable valve sleeve 221 also includes an elongated continuous arcuate channel 241, which extends half-way around the circumference of the adjustable valve sleeve 221. This channel 241 does not extend through to the inner radial face of the adjustable valve sleeve 221, so that in eight angular positions of the adjustable valve sleeve 221 the inlet pressure port 6R₁ in the fixed inner valve sleeve 220 does not communicate with a passage in the adjustable valve sleeve 221. This channel 250 is formed only in the outer radial face of the adjustable valve sleeve 221 and does not extend through to the inner radial face of this sleeve, so that in eight angular settings of the adjustable sleeve 221 about the fixed inner sleeve 220 the pressure inlet passage 6L₁ in the fixed inner sleeve 220 is blocked by the adjustable valve sleeve 221.

The third row of passages in the adjustable valve sleeve 221 from its axial inner end includes a series of four evenly-spaced radial passages 251—254, an elongated continuous arcuate channel 255 extending around one quarter of the circumference of the adjustable valve sleeve 221, a next series of four evenly-spaced radial passages 256—259, and another elongated continuous arcuate channel 260 extending around one quarter of the circumference of the adjustable valve sleeve 221. Each of the radial passages in the third row of passages in the adjustable valve sleeve 221 is positioned to communicate with the pressure inlet passage 5L₁ in the fixed valve sleeve 220 in particular angular locations of the adjustable valve sleeve 221 about the fixed valve sleeve 220. The arcuate channels 255 and 260 do not extend through the adjustable valve sleeve 221, so that the pressure inlet passage 5L₁ in the fixed inner valve sleeve 220 is blocked when these channels in the adjustable valve sleeve 221 are aligned with it.

In the adjustable valve sleeve 221 the fourth row of passages from its axial inner end includes a series of four evenly-spaced radial passages 261—264, an elongated continuous arcuate channel 265 extending around one quarter of the circumference of the adjustable valve sleeve 221, a next series of four evenly-spaced radial passages 266—269, and another elongated continuous arcuate channel 270 extending around one quarter of the circumference of the adjustable valve sleeve 221. Each of the radial passages in the fourth row is positioned to communicate with the pressure inlet passage 5R₁ in the fixed valve sleeve 220 in particular angular locations of the adjustable valve sleeve 221 about the fixed inner valve sleeve 220. However, since the channels 265 and 270 in the adjustable valve sleeve 221 do not extend through this valve sleeve, the pressure inlet passage 5R₁ in the fixed valve sleeve 220 is blocked when either of these channels is aligned with it.

The next row of passages in the adjustable valve sleeve 221 includes a first series of three evenly-spaced channels 271—273 which extend a short distance axially inwardly along the adjustable valve sleeve 221, a radial passage 274, a second series of three evenly-spaced channels 275-277 which extend a short distance axially inwardly along the adjustable valve sleeve 221, a second radial passage 278, a third series of three even-spaced channels 279—281 which extend a short distance axially inwardly along the adjustable valve sleeve 221, a third radial passage 282, a fourth series of three evenly-spaced channels 283—285 which extend a short distance axially inwardly along the adjustable valve sleeve 221, and a fourth radial passage 286. The radial passages in this row are adapted to register selectively with the passages 3L₁, 4R₁, 1L₁, and 2R₁ in the fixed inner valve sleeve 220, depending upon the angular position of the adjustable valve sleeve 221 about the fixed inner valve sleeve 220. The channels 271-273, 275-277, 279-281 and 283-285 do not extend through the adjustable valve sleeve 221 and hence do not communicate with the pressure inlet passages 3L₁, 4R₁, 1L₁ and 2R₁ in the fixed inner valve sleeve 220.

The final row of passages in the adjustable valve sleeve 221 includes a first series of three evenly-spaced radial passages 287—289, a first channel 290 extending a short distance axially inwardly along the adjustable valve sleeve 221, a second series of three evenly-spaced radial passages 291-293, a second channel 294 extending a short distance axially inwardly along the adjustable valve sleeve 221, a third series of evenly-spaced radial passages 295-297, a third channel 298 extending a short distance axially inwardly along the adjustable valve sleeve 221, a fourth series of evenly-spaced radial passages 299—301, and a fourth channel 302 extending axially inwardly a short distance along the adjustable valve sleeve 221. The radial passages in the last row in the adjustable valve sleeve are adapted to register selectively with the passages 3R₁, 4L₁, 1R₁ and 2L₁ in the fixed inner valve sleeve 220, depending upon the angular position of the adjustable valve sleeve 221 about the fixed inner valve sleeve 220. The channels 290, 294, 298 and 302 do not extend through the adjustable valve sleeve 221 and hence do not communicate with the pressure inlet passages 3R₁, 4L₁, 1R₁ and 2L₁ in the fixed inner valve sleeve 220.

The adjustable valve sleeve 221 adjacent its outer end is formed with a circumferential channel 303 for receiving a sealing ring 304 (Fig. 2).

Stationary valve body

The stationary valve body 222 is in the form of a cylindrical axially inwardly extending sleeve portion 310, which snugly surrounds the adjustable valve sleeve 221 just described, and a transverse cylindrical distributor flange 311 at its axially outer end, which is shaped to be received snugly in a complementary annular recess 312 formed in the outer axial face of the stationary end plate 223. The axially inwardly extending sleeve portion 310 of the valve body extends loosely through a central hole 313 formed in the end plate 223 and an adjoining central hole 314 in the manifold 224, so that an annular space 315 (Fig. 2) is formed between the outer periphery of the sleeve portion 310 of the valve body and these members. This annular space 315 provides an exhaust passage for the return of oil to the oil reservoir from one end of each of the piston cylinders 1–6 when oil under pressure is supplied to the respective opposite ends of the piston cylinders, as will be described in detail hereinafter.

The stationary valve body 222 is formed with a plurality of exhaust passages extending radially through its sleeve portion 310. These passages effect communication between passages in the adjustable valve sleeve 221 and the annular exhaust passage 315 surrounding the sleeve portion 310 of the valve body 222 and leading to the oil reservoir.

The valve body 222 is also formed with a plurality of passages which are open at the radially inner face of its sleeve portion 310 for communication with passages in the adjustable valve sleeve 221. These passages extend interiorly along the length of the valve body 222 and at their opposite ends terminate in ports at the axial inner face 316 of the flange 311 on the valve body, these ports being positioned to register with passages in the adjacent face 317 of the end plate 223 at which the head 311 on the valve body is snugly seated. These passages in the end plate 223 in turn lead to opposite ends of the piston chambers in the cylinders 1–6, as will be described in detail hereinafter.

Referring to the development of the valve body 222 shown in Fig. 7, the valve body adjacent its axial inner end is formed with a first row of passages which includes a pair of radial exhaust passages 320 and 321 positioned to register selectively with the first row passages 233–241 in the adjustable valve sleeve 221. There is also provided a passage $6R_2$ which has at one end a port 322 at the inner radial face of the sleeve portion 310 of the valve body positioned to register selectively with the first row passages 233–241 in the adjustable valve sleeve 221. This passage $6R_2$ extends lengthwise interiorly through the sleeve portion 310 of the valve body into the flange 311 of the valve body. At the flange 311 the passage $6R_2$ includes a radially outwardly extending portion, which in turn leads to an axially inwardly extending portion which terminates in a port at the inner axial face 316 of flange 311.

The construction of the above-described passage $6R_2$ except for its location and length is essentially the same as that of the passage $1R_2$, which is shown in detail in the cut-away portion of the valve body 222 shown in Fig. 7. As indicated in this detailed showing, the passage $1R_2$ includes a port 323 at the inner radial face of the sleeve portion 310 of the valve body positioned to register selectively with passages in a row of passages in the adjustable valve sleeve 221, a portion 324 extending lengthwise interiorly through the sleeve portion 310 of the valve body 222 into the flange 311 of the valve body, a radially outwardly extending portion 325 at the flange 311, and an axially inwardly extending portion 326 at the flange 311 which terminates in a port 327 at the inner axial face 316 of flange 311 positioned to register with a passage in the end plate 223 leading to the right end of the piston chamber in cylinder 1.

The second row of passages in the valve body 222 from the latter's inner axial end includes a pair of radial exhaust passages 328 and 329 and an elongated passage $6L_2$ leading to the inner axial face 316 of the flange 311 on the valve body. The passages in the second row are adapted to register selectively with the passages 242—250 forming the second row of passages in the adjustable valve sleeve 221.

The third row of passages in the valve body 222 from its inner axial end includes the radial exhaust passages 330 and 331 and an elongated passage $5L_2$ leading to the inner axial face 316 of the valve body flange 311. These passages in the valve body register selectively with the passages 251—260 which form the third row of passages in the adjustable valve sleeve 221.

The fourth row of passages in the valve body 222 from its inner axial end includes the radial exhaust passages 332 and 333 and an elongated passage $5R_2$ leading to a port at the inner axial face 316 of the valve body flange 311. These passages in the valve body register selectively with the passages 261—270 which form the fourth row of passages in the adjustable valve sleeve 221.

The next row of passages in the valve body 222 from its inner axial end includes the radial exhaust passages 334, 335, 336, and 337 which are located to register selectively with the inner axial ends of the channels 271—273, 275—277, 279—281, and 283—285 at the fifth row of passages in the adjustable valve sleeve 221.

The next row of passages in the valve body from its inner axial end consists of the elongated passages $3L_2$, $4R_2$, $1L_2$ and $2R_2$ leading respectively to ports at the inner axial face 316 of the valve body flange 311. These passages communicate with the outer axial ends of the channels 271—273, 275—277, 279—281, and 283—285 and with the radial passages 274, 278, 282 and 286 forming the fifth row of passages in the adjustable valve sleeve 221.

The next row of passages in the valve body 222 consists of the radial passages 338, 339, 340, 341 which are positioned to communicate selectively with the inner axial ends of the channels 290, 294, 298, and 302 in the sixth row of passages in the adjustable valve sleeve 221.

The final axially outermost row of passages in the valve body 222 consists of the elongated passages $3R_2$, $4L_2$, $1R_2$ and $2L_2$ leading respectively to ports at the inner face 316 of the valve body flange 311. These passages are positioned to register selectively with the radial passages 287—289, 291—293, 295—297, and 299—301 and with the outer axial ends of the channels 290, 294, 298, and 302 forming the final row of passages in the adjustable valve sleeve 221.

End plate

The end plate 223 of the speed selector valve has a flat annular face 317 against which the inner axial face 316 of the flange 311 on the valve body 222 abuts. This flat annular face 317 surrounds the central axial hole 313 in the end plate through which the valve body sleeve 310 extends. At this flat annular face 317 the end plate is formed with a plurality of passages $6R_3$, $3R_3$, $4L_3$, $1R_3$, $2L_3$, $3L_3$, $4R_3$, $1L_3$, $2R_3$, $5R_3$, $5L_3$, and $6L_3$ which communicate with the correspondingly numbered passages $6R_2$, $3R_2$ etc. in the valve body 222. All of these passages in the end plate 223 except the passages $1R_3$ and $2L_3$ extend axially straight through the end plate to its opposite axial face, at which it abuts against the manifold 224. The passage $1R_3$ in the end plate 223 includes a straight axial portion 350, a downwardly extending portion 351, and an axial portion 352 leading from the downwardly extending portion 351 to the adjacent axial face of the manifold 224. The end plate passage $2L_3$ similarly includes an axial portion 353, a downwardly extending portion 354, and an axial portion 355 leading to the adjacent axial face of the manifold 224.

Manifold

The outer axial face 356 on the manifold 224 against which the end plate 223 abuts is formed with a plurality of channels 6R$_4$, 3R$_4$, 4L$_4$, 3L$_4$, 4R$_4$, 1L$_4$, 1R$_4$, 2R$_4$, 2L$_4$, 5R$_4$, and 5L$_4$ positioned to communicate with the correspondingly numbered passages 6R$_3$ etc. in the manifold and leading to axial manifold passages 6R$_5$, 3R$_5$, 4L$_5$, 3L$_5$, 4R$_5$, 1L$_5$, 1R$_5$, 2R$_5$, 2L$_5$, 5R$_5$, and 5L$_5$ leading respectively to the corresponding right or left end of the piston chambers in the cylinders 1—6.

Operation of speed selector valve

In the operation of the above-described speed selector valve, the various flows through this valve to and from the opposite ends of the piston cylinders 1—6 take place as follows in the number 1 speed setting (lowest speed):

The adjustable valve sleeve 221 is turned to position the speed indicating numeral "25" at the arrow 232 on the end plate 223, to set the transmission to drive the spindle at 25 revolutions per minute. This positions passage 300 in the adjustable valve sleeve 221 in register with the pressure inlet passage 3R$_1$ in the fixed inner valve sleeve. Also, passage 301 in the adjustable valve sleeve 221 registers with the pressure inlet passage 4L$_1$ in the fixed inner valve sleeve 220; passage 287 in the adjustable valve sleeve registers with pressure inlet passage 2L$_1$ in the fixed inner valve sleeve 220; passage 264 in the adjustable valve sleeve 221 registers with the pressure inlet passage 5R$_1$ in the fixed valve sleeve 220; and passage 240 in the adjustable valve sleeve 221 registers with the pressure inlet passage 6R$_1$ in the fixed inner valve sleeve 220. This establishes flows of oil under pressure from the central pressure inlet chamber 225 in the fixed inner valve sleeve 220 through the adjustable valve sleeve 221 and thence through the passages numbered 1L, 2L, 3R, 4L, 5R, and 6R in the valve body 222, the end plate 223 and the manifold 224 to passages leading from the manifold respectively to the left end of the piston chamber in cylinder 1, the left end of the piston chamber in cylinder 2, the right end of the piston chamber in cylinder 3, the left end of the piston chamber in cylinder 4, the right end of the piston chamber in cylinder 5, and the right end of the piston chamber in cylinder 6.

At the same time, oil is exhausted from the respective opposite ends of the piston chambers in the cylinders 1–6. Channel 302 in the adjustable valve sleeve 221 registers with the elongated valve body passage 1R$_2$ and the exhaust passage 340 in the valve body 222, that fluid emptied from the right end of the piston chamber in cylinder 1 passes through the passages numbered 1R in the manifold 224 and end plate 223, and thence through elongated passage 1R$_2$ in valve body 222 and channel 302 in the adjustable valve sleeve 221 to the exhaust passage 340 in the valve body, which leads through the annular space 315 around the valve body sleeve 310 to the oil reservoir. In like manner, channel 275 in the adjustable valve sleeve 221 effects communication between the elongated valve body passage 2R$_2$ and the drain passage 337 in the valve body, channel 273 in the adjustable valve sleeve effects communication between the elongated valve body passage 4R$_2$ and the exhaust passage 335 formed in the valve body, channel 272 in the adjustable valve sleeve effects communication between the elongated valve body passage 3L$_2$ and the exhaust passage 334 leading from the valve body, channel 255 in the adjustable valve sleeve effects communication between the elongated valve body passage 5L$_2$ and the exhaust passage 330 leading from the valve body, and channel 259 in the adjustable valve sleeve effects communication between the elongated valve body passage 6L$_2$ and the exhaust passage 339 leading from the valve body, so that oil is exhausted from the corresponding ends of the piston chambers in the correspondingly numbered cylinders 1–6 through the correspondingly numbered passages in the manifold and end plate, and thence through the valve body and adjustable valve sleeve passages to the oil reservoir, as described.

Thus, it will be seen that in this speed setting, certain of the radial passages in the adjustable valve sleeve 221 are operative to pass oil under pressure from the central inlet pressure chamber 225 in the fixed valve sleeve 220 to elongated passages in the valve body 222 leading to the appropriate ends of the piston chambers of the cylinders 1–6. Also, it will be noted that certain of the channels in the adjustable valve sleeve 221 effect communication between the other elongated passages in the valve body 222, which communicate with the opposite ends of the piston chambers of the cylinders 1–6, and exhaust passages in the valve body for exhausting oil from said opposite ends of the piston chambers.

From the respective positions of the various passages in the valve ports shown in Fig. 7, it will be evident to those skilled in the art that for each other angular position of the adjustable valve sleeve 221, which results in a different speed setting of the transmission to the spindle, certain of the radial passages in the adjustable valve sleeve 221 function to pass oil under pressure to elongated passages in the valve body 222 lead to appropriate ends of the piston chambers for the cylinders 1–6, while certain of the channels in the adjustable valve sleeve 221 function to pass oil from the opposite ends of the piston chambers in the cylinders 1–6 to the exhaust passages in the valve body 222 leading to the oil reservoir. For the sake of brevity, these various flow paths through the speed selector valve for each speed setting will not be traced out in detail since such information will be evident from a careful study of Fig. 7.

Figure 2 gives a more graphic picture of the flows through the speed selector valve to and from one of the cylinders for controlling the transmission to the spindle. This figure shows the speed selector valve in its No. 16 speed setting (highest speed) and the flows through the valve to and from the piston chamber of cylinder 1. The exhaust flow through the valve is shown in this figure only in a simplified schematic fashion for purposes of clarity; the pressure flow shown in this figure is an actual representation of the flow through the valve.

Referring to Fig. 2, in the No. 16 speed setting the adjustable sleeve 221 is positioned with its radial passage 287 registering with the pressure inlet passage 1R$_1$ in the fixed inner valve sleeve 220 and with the elongated valve body passage 1R$_2$. The latter valve body passage communicates with the passage 1R$_3$ in the end plate 223, which passage in turn leads to the channel 1R$_4$ in the manifold 224 which terminates at the manifold passage 1R$_5$. Passage 1R$_5$ leads to a passage 360 in the casing communicating with the right end of the piston chamber of cylinder 1. Thus, there is established a flow of oil under pressure from the pressure inlet chamber 225 in the fixed inner sleeve 220 through the passages 1R$_1$, 287, 1R$_2$, 1R$_3$, channel 1R$_4$, and passages 1R$_5$ and 360 to the right end of the piston chamber in cylinder 1.

Also, at this position of the adjustable valve sleeve 221 its channel 275 registers with the elongated passage 1L$_2$ in the valve body and with the exhaust passage 336 in the valve body. Thus, oil from the left end of the piston chamber in cylinder 1 is exhausted through the passage 361 in the casing, manifold passage 1L$_5$, manifold channel 1L$_4$, end plate passage 1L$_3$, elongated passage 1L$_2$ in the valve body, channel 275 in the adjustable valve sleeve 221, and exhaust passage 336 in the valve body to the annular space 315 surrounding the valve body sleeve 310 to the oil reservoir. This exhaust flow is shown only schematically in Fig. 2, in order to illustrate in a general way the operation of the valve, since it is not possible to present in a single sectional view through the valve an actual physical representation of the passages leading to both ends of the piston chamber of any particular cylinder.

Figure 8:
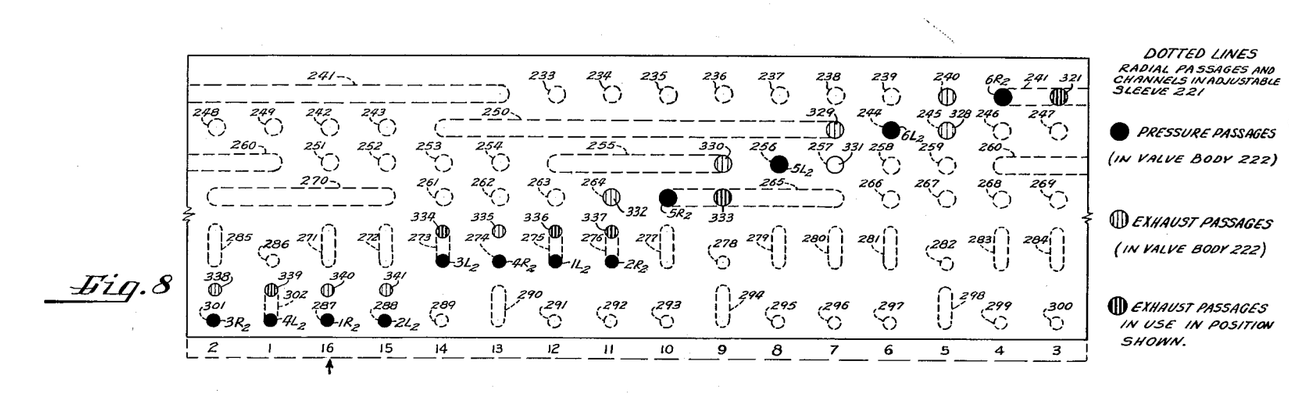
Figure 8 is a view showing in superposed relation the developments of the valve parts in Figure 7 to illustrate the flows through this valve in the highest speed setting thereof.

To illustrate the operation of the speed selector valve there is shown in Fig. 8 a schematic slide-rule type of representation of the superposed developments of the valve body 222 and the adjustable valve sleeve 221. The solid line ports in this figure represent the described elongated and exhaust passages in the valve body 222. (Certain of these solid line ports also represent the passages in the fixed inner valve sleeve 220, which are aligned with the elongated passages in the valve body 222 and which are adapted to communicate therewith through passages in the adjustable valve sleeve 221 when the latter is suitably positioned to effect such communication.) The dotted lines represent passages in the adjustable valve sleeve 221, which are positioned beneath the valve body for selective registration with passages therein. Since the adjustable valve sleeve 221 may be shifted with respect to the valve body, it will be realized that the dotted line passages in this figure are shiftable with respect to the full line ports for the different speed settings of the speed selector valve.

In Figure 8 the various passages are shown schematically in their respective positions for the highest speed setting, No. 16.

It will be noted that in this speed setting the radial passage 287 in the adjustable valve sleeve 221 registers with the elongated body passage $1R_2$ (and with the aligned pressure inlet passage $1R_1$ in the fixed inner valve sleeve 220) for passing oil under pressure to the right end of cylinder 1. Also, in this speed setting the channel 275 in the adjustable valve sleeve 221 effects communication between the elongated valve body passage $1L_2$ and the exhaust passage 336 in the valve body 222 for passing to the oil reservoir the oil from the left end of cylinder 1.

Also, in this speed setting the radial passage 288 in the adjustable valve sleeve 221 registers with the elongated valve body passage $2L_2$ (and with the aligned pressure inlet passage $2L_1$ in the fixed inner valve sleeve 220) for passing oil under pressure to the left end of cylinder 2. Channel 276 in the adjustable valve sleeve 221 effects communication between the elongated valve body passage $2R_2$ and the exhaust passage 337 in the valve body for exhausting the oil from the right end of cylinder 2.

Also, in this speed setting the radial passage 301 in the adjustable valve sleeve 221 registers with the elongated valve body passage $3R_2$ (and with the aligned pressure inlet passage $3R_1$ in the fixed inner valve sleeve 220) for passing oil under pressure to the right end of cylinder 3. Channel 273 in the adjustable valve sleeve effects communication between the elongated valve body passage $3L_2$ and the exhaust passage 334 in the valve body for exhausting the oil from the left end of cylinder 3.

In this speed setting the radial passage 274 in the adjustable valve sleeve 221 registers with the elongated valve body passage $4R_2$ (and with the aligned pressure inlet passage $4R_1$ in the fixed inner valve sleeve 220) for passing oil under pressure to the right end of cylinder 4. Channel 302 in the adjustable valve sleeve effects communication between the elongated valve body passage $4L_2$ and the exhaust passage 339 in the valve body for exhausting the oil from the left end of cylinder 4.

Likewise, in this speed setting the radial passage 256 in the adjustable valve sleeve 221 registers with the elongated valve body passage $5L_2$ (and with the aligned pressure inlet passage $5L_1$ in the fixed inner valve sleeve 220) for passing oil under pressure to the left end of cylinder 5. Channel 265 in the adjustable valve sleeve 221 effects communication between the elongated valve body passage $5R_2$ and the exhaust passage 333 in the valve body for exhausting the oil from the right end of cylinder 5.

And in this speed setting the radial passage 244 in the adjustable valve sleeve 221 registers with the elongated valve body passage $6L_2$ (and with the aligned pressure inlet passage $6L_1$ in the fixed inner valve sleeve 220) for passing oil under pressure to the left end of cylinder 6. Channel 241 in the adjustable valve sleeve 221 effects communication between the elongated valve body passage $6R_2$ and the exhaust passage 321 in the valve body for exhausting the oil from the right end of cylinder 6.

For the other speed settings the adjustable valve sleeve 221 is shifted to displace its passages (shown in dotted lines in Fig. 8) relative to the valve body passages (shown in full lines in Fig. 8). The relative positions of the passages in the adjustable valve sleeve and the valve body passages for each speed setting may be visualized by displacing the dotted line passages in Fig. 8 in accordance with the desired speed setting located adjacent the indicator arrow at the bottom of this figure. In this manner, the various flows of oil to and from opposite ends of the various cylinders 1–6 through the relatively movable parts of the speed selector valve for each speed setting may be traced.

From Fig. 1 it will be noted that cylinder 5 is under the joint control of the speed selector valve and the manually controlled rotary valve 182. The passages $5L_5$ and $5R_5$ in the manifold of the speed selector valve lead respectively to passages 362 and 363 in the casing, which communicate respectively with the passages 189 and 192 in the valve body 187 in which the rotary valve 182 operates. As previously described, the rotary valve 182 controls the communication between these passages 189 and 192 and the passages 190 and 193 in the valve body leading to the left and right ends respectively of the piston chamber in cylinder 5.

*Overall operation of the entire apparatus*

Figure 9:
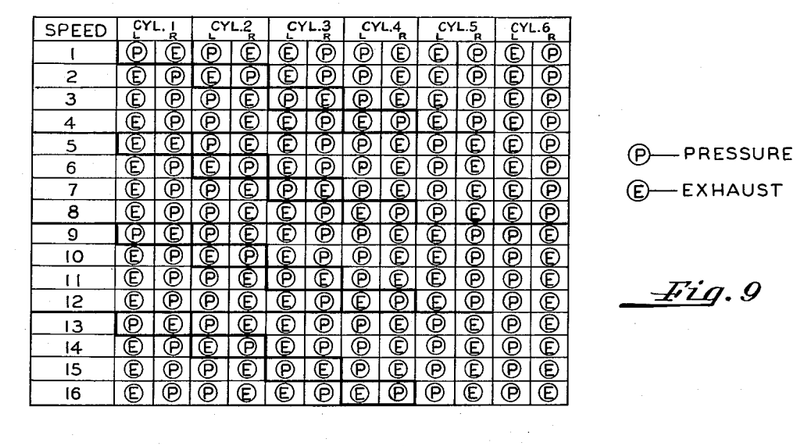
Figure 9 is a diagram indicating the pressure and exhaust conditions at each of the hydraulic cylinders in the shifting assembly of the present invention for each speed setting of the speed selector valve.

Figure 9 is a chart showing the various pressure and exhaust conditions in the cylinders 1—6 for each speed setting of the speed selector valve. These pressure and exhaust conditions in the cylinders are determined by the flows through the speed selector valve, which are established by the various communicating passages in the valve parts, as described.

The arrangement of the passages in the speed selector valve is such that cylinder 1 has pressure at its left end in the first, fifth, ninth and thirteenth speed settings, as indicated in Fig. 9, to shift the clutch 25 on gear-clutch unit 21—25 into engagement with the clutch 29 driven by the input drive shaft 17, so that gear 21 is driven from drive shaft 17. In these speed settings, the oil pressure to the cylinders 2, 3 and 4, which control the other shiftable gear-clutch units on the input drive shaft 17, is such that these clutch members are disengaged from driving relation with shaft 17. The described ball arrangement in the cylinder block 110 locks the pistons for these other gear-clutch units in their respective inoperative positions.

In the second, sixth, tenth and fourteenth speed settings of the speed selector valve, cylinder 2 has pressure at its right end to shift the clutch 24 on gear-clutch unit 20—24 into engagement with the clutch member 29 driven by the input drive shaft 17. Thus, gear 20 is driven from the input drive shaft 17 in these speed settings. In these speed settings, the oil pressure to the cylinders 1, 3 and 4, which control the other shiftable gear-clutch units on the input drive shaft 17, maintains these gear-clutch units disengaged from driving relation with shaft 17. In addition, the pistons which control the shifting forks for these gear clutch units are locked in their respective drive-disconnecting positions by the described ball arrangement in cylinder block 110.

In the third, seventh, eleventh and fifteenth speed settings of the speed selector valve, the cylinder 3 has pressure at its left end to shift the clutch 23 on gear-clutch unit 19—23 into engagement with the clutch member 26 driven by the input drive shaft 17. In this manner, gear 19 is driven from the input drive shaft 17 in these speed settings. Also, in these speed settings the oil pressure to the cylinders 1, 2 and 4 is such as to maintain the other gear-clutch units 21—25, 20—24, and 18—22 disconnected from driving relation with the input drive shaft 17, the pistons in these cylinders being locked in their respective inoperative positions by the ball arrangement in cylinder block 110.

In the fourth, eighth, twelfth and sixteenth speed settings of the speed selector valve, the cylinder 4 has pressure at its right end so that gear-clutch unit 18—22 is shifted into engagement with the clutch member 26 driven from the input drive shaft 17. The other gear-clutch units on the input drive shaft are maintained out of driving relation with this shaft in these speed settings by the oil pressure exerted against the corresponding cylinders 1, 2 and 3, and by the locking of the pistons for these cylinders in their respective drive-disconnecting positions by the ball arrangement in cylinder block 110.

In the first, second, third, fourth, ninth, tenth, eleventh and twelfth speed settings of the speed selector valve, pressure is applied to the right end of cylinder 5 so that clutch 78 is shifted into engagement with the clutch member 71 driven from shaft 51 in the transmission. In the other speed settings, pressure is applied to the left end of cylinder 5 so that clutch 77 is shifted into engagement with the clutch member 69 driven from shaft 51. Thus, the spindle 11 is driven from shaft 51 either through the gears 76, 82 or through the gears 75, 81.

In the lowest eight speed settings of the speed selector valve, pressure is applied to the right end of cylinder 6 so that clutch 63 is shifted into engagement with clutch 68, for driving shaft 51 from the idler shaft 48 through gears 49 and 56. In the highest eight speed settings, pressure is applied to the left end of cylinder 6 so that clutch 63 is shifted into engagement with clutch 67, for establishing a drive to shaft 51 from the idler shaft 48 through gears 47 and 50.

As previously explained, the manual lever 207 provides an "on" and "off" control for the drive to the spindle. When this lever is in its extreme clockwise position it maintains the clutches 77 and 78 in neutral to disconnect the spindle from the transmission and to de-energize the driving motor for the transmission. In its extreme counter-clockwise position lever 207 permits the clutches 77 and 78 to be shifted selectively either into engagement with the clutch 69 or into engagement with the clutch 71, depending upon the position of the speed selector valve.

While in the foregoing description and the accompanying drawings there are disclosed a particular useful application of the hydraulic control apparatus of the present invention and a particular form of this hydraulic control apparatus, it is to be understood that the invention is adapted for other uses and that various modifications, omissions and refinements which depart from the described embodiment of the hydraulic control apparatus may be adopted without departing from the spirit and scope of this invention.

I claim:

1. In an hydraulic control apparatus of the character described, the combination of a plurality of hydraulic cylinders, pistons reciprocable in said cylinders, fluid pressure ports in said cylinders at opposite sides of said pistons, and a multi-flow control valve communicating with said cylinder ports for controlling the flow of fluid to and from the cylinders, said control valve including a valve body formed with a plurality of first passages each communicating with a cylinder port and also formed with a plurality of exhaust passages, a fixed inner valve sleeve formed with a plurality of pressure inlet passages, and an adjustable valve sleeve disposed between said valve body and said fixed inner valve sleeve, said adjustable sleeve being formed with a plurality of passages constructed and arranged to selectively effect communication between said pressure inlet passages in the fixed inner valve sleeve and certain of said first passages in the valve body for passing fluid under pressure from said fluid pressure inlet passages through the control valve to cylinder ports at one side of each of the pistons, said adjustable valve sleeve also being formed with other passages constructed and arranged to effect communication between the others of said first passages in the valve body and exhaust passages in the valve body for exhausting fluid through the control valve from the opposite sides of said pistons.

2. In an hydraulic control apparatus of the character described, the combination of means defining a plurality of hydraulic cylinders, a plurality of pistons reciprocable in said hydraulic cylinders between operative and inoperative positions, fluid pressure ports in said cylinders at opposite sides of said pistons, a multi-flow control valve for controlling the flow of fluid to said hydraulic cylinders through said cylinder ports, said valve including a fixed inner sleeve formed with pressure inlet passages, a valve body formed with passages communicating with said cylinder ports, and an adjustable valve sleeve disposed between said valve body and said inner sleeve and formed with a plurality of passages operative to selectively effect communication between said pressure inlet passages in the inner valve sleeve and said passages in the valve body for selectively passing fluid to said hydraulic cylinders for actuating the pistons, and means acting between said pistons and operable in response to the actuation of one piston to its operative position for locking the other pistons in their respective inoperative positions.

3. In an hydraulic control apparatus, the combination of a cylinder block having a plurality of spaced longitudinal passages and an hydraulic cylinder for each such passage, pistons reciprocable in said cylinders between operative and inoperative positions, fluid pressure ports in said cylinders at opposite sides of said pistons, a multi-flow control valve communicating with said cylinder ports and operative to control selectively the supply of fluid under pressure to and the exhaust of fluid from opposite ends of the cylinders for selectively actuating the pistons to operative or inoperative positions respectively, and means acting between said pistons and operable in response to the actuation of one piston to its operative position for locking the other pistons in their respective inoperative positions, including a reduced neck portion on each piston, a plurality of intersecting transverse cylinder passages communicating with said longitudinal cylinder passages, balls located respectively in each of said transverse cylinder passages and positioned to engage the pistons in the adjacent longitudinal cylinder passages, said balls being so mounted that the inward force exerted by one of said pistons against the adjacent ball when said piston is actuated to its operative position to place its reduced neck portion away from engagement with said adjacent ball causes the ball to exert an outward force on the other balls urging them into locking engagement with the reduced neck portions on the other pistons to lock said other pistons in their respective inoperative positions.

4. In an hydraulic control apparatus of the character described, a multi-flow valve, said valve comprising a fixed inner valve sleeve formed with a cylindrical outer periphery, said inner valve sleeve having a central fluid pressure chamber and a plurality of pressure passages communicating with said central pressure chamber and terminating in ports at the outer periphery of the inner valve sleeve having spaced locations axially and circumferentially thereon, a valve body formed with a cylindrical sleeve portion shaped to extend around said cylindrical periphery of said fixed inner sleeve and formed with an enlarged transverse flange, said valve body being formed with elongated passages which extend between ports at the inner radial face of the cylindrical sleeve portion of the valve body and ports at the flange on the valve body, said valve body also being formed with exhaust passages extending between the inner and outer radial faces of the cylindrical sleeve portion of the valve body, and an adjustable cylindrical valve sleeve snugly received between said cylindrical outer periphery of the fixed inner valve sleeve and the inner radial face of said cylindrical sleeve portion of the valve body, said adjustable valve sleeve being formed with a plurality of passages constructed and arranged to selectively register with said pressure passages in the fixed inner valve sleeve and certain of the ports at the inner radial face of said cylindrical sleeve portion of the valve body which lead to elongated passages in the valve body for passing fluid under pressure from said central pressure chamber in the fixed inner valve sleeve through elongated passages in the valve body, and said adjustable valve sleeve also being formed with a plurality of channels in its outer radial face constructed and arranged to effect communication between exhaust passages in the valve body and the others of said ports at the inner radial face of said cylindrical sleeve portion of the valve body which lead from the other elongated passages in the valve body for exhausting fluid from said other elongated passages in the valve body.

5. In an hydraulic control apparatus of the character described, a multi-flow valve for controlling the flow of fluid to and from opposite ends of piston cylinders, said valve comprising a fixed inner sleeve formed with fluid pressure inlet passages, a valve body formed with first passages adapted to communicate with the opposite ends of the piston cylinders, said valve body also being formed with exhaust passages, and an adjustable valve sleeve disposed between said valve body and said inner valve sleeve and formed with a plurality of passages constructed and arranged to selectively effect communication between said pressure inlet passages in the fixed sleeve and certain of said first passages in the valve body for passing fluid to one end of each of the piston cylinders, said adjustable valve sleeve also being formed with other passages constructed and arranged to effect communication between the others of said first passages in the valve body and exhaust passages in the valve body for exhausting fluid from the opposite ends of the piston cylinders.

6. In an hydraulic control apparatus of the character described, a multi-flow valve for controlling a plurality of hydraulic devices, said valve comprising a fixed inner valve sleeve formed with a central fluid pressure chamber and a plurality of pressure passages extending outwardly therefrom, a valve body formed with a plurality of first passages adapted to communicate with predetermined portions of the hydraulic devices for controlling the actuation of the hydraulic devices, said valve body also being formed with a plurality of exhaust passages, and an adjustable valve sleeve disposed between said valve body and said inner valve sleeve and formed with a plurality of passages constructed and arranged to selectively effect communication between said pressure passages in the inner valve sleeve and certain of said first passages in the valve body for passing fluid under pressure to certain portions of the hydraulic devices for actuating the hydraulic devices in a predetermined manner, said adjustable valve sleeve also being formed with a plurality of channels in its outer face constructed and arranged to effect communication between the others of said first passages in the valve body and exhaust passages in the valve body for exhausting fluid from the other portions of the hydraulic devices.

7. In an hydraulic control apparatus of the character described, a multi-flow valve comprising a fixed inner valve sleeve formed with a plurality of fluid pressure inlet passages, a valve body formed with a plurality of first passages leading from the valve and plurality of exhaust passages, and an adjustable valve sleeve disposed between said valve body and said fixed inner valve sleeve, said adjustable valve sleeve being formed with a plurality of passages constructed and arranged to selectively effect communication between said pressure inlet passages in the fixed inner valve sleeve and certain ones of said first passages in the valve body for passing fluid under pressure from said pressure inlet passages in the fixed inner valve sleeve to said certain ones of the first passages in the valve body, said adjustable valve sleeve also being formed with other passages constructed and arranged to effect communication between the others of said first passages in the valve body and exhaust passages in the valve body for exhausting fluid from said others of said first passages in the valve body.

8. In an hydraulic control apparatus of the character described, a multi-flow valve comprising a fixed inner valve sleeve having a central fluid pressure chamber and a plurality of pressure passages communicating with said central pressure chamber and terminating in ports at the outer periphery of the inner valve sleeve having spaced locations axially and circumferentially thereon, a valve body formed with a cylindrical sleeve portion shaped to extend around said cylindrical periphery of said fixed inner sleeve and formed with an enlarged transverse flange, said valve body being formed with elongated passages which extend between ports at the inner radial face of the cylindrical sleeve portion of the valve body and ports at the flange on the valve body, said valve body also being formed with exhaust passages extending between the inner and outer radial faces of the cylindrical sleeve portion of the valve body, and an adjustable cylindrical valve sleeve snugly received between said cylindrical outer periphery of the fixed inner valve sleeve and the inner radial face of said cylindrical sleeve portion of the valve body, said adjustable valve sleeve being formed with a plurality of passages constructed and arranged to selectively register with said pressure passages in the fixed inner valve sleeve and certain of the ports at the inner radial face of said cylindrical sleeve portion of the valve body which lead to elongated passages in the valve body for passing fluid under pressure from said central pressure chamber in the fixed inner valve sleeve through elongated passages in the valve body, and said adjustable valve sleeve also being formed with a plurality of channels in its outer radial face constructed and arranged to effect communication between exhaust passages in the valve body and the others of said ports at the inner radial face of said cylindrical sleeve portion of the valve body which lead from the other elongated passages in the valve body for exhausting fluid from said other elongated passages in the valve body.

9. In an hydraulic control apparatus of the character described, in combination, a cylinder block formed with a central chamber and four longitudinal cylinder passages substantially equally spaced circumferentially about said central chamber, pistons reciprocable in said longitudinal cylinder passages, each of said pistons being formed with a reduced neck portion, a plurality of intersecting transverse cylinder passages communicating with said longitudinal cylinder passages and intersecting said central chamber, a floating spacing member in said central chamber, and balls located respectively in each one of said transverse cylinder passages and positioned to engage said floating spacing member and also to engage the pistons in the adjacent longitudinal cylinder passages, said balls being mounted such that the inward force exerted by one of said pistons against the adjacent ball when said piston is positioned to place its reduced neck portion away from engagement with said adjacent ball causes said ball to exert an outward force on the other balls through the action of said floating spacing member urging them into locking engagement with the reduced neck portions on the other pistons to lock said other pistons against movement.

10. An hydraulically controlled variable speed transmission apparatus of the character described, comprising a plurality of shiftable drive elements in the transmission for establishing different speed drives to a driven element, and a multi-flow speed selector valve operative to control hydraulically the shifting of said plurality of shiftable drive elements for selectively establishing the desired speed drive through the transmission to the driven element, said speed selector valve comprising a fixed inner sleeve formed with pressure inlet passages, a valve body formed with passages leading to hydraulic devices for shifting the drive elements and an adjustable valve sleeve disposed between said valve body and said inner sleeve and formed with a plurality of passages operative to selectively effect communication between said pressure inlet passages in the inner sleeve and said passages in the valve body.

11. An hydraulically controlled variable speed transmission apparatus of the character described, comprising a transmission including a plurality of shiftable drive elements for establishing different speed drives to a driven element, one of said shiftable drive elements controlling the connection of the transmission to the driven element, a main control mechanism operative to control the shifting of said one drive element in the transmission between an operative position connecting the transmission to the driven element and an inoperative position disconnecting the transmission from the driven element, and a multi-flow speed selector valve operative to control hydraulically the shifting of all of said shiftable drive elements in the transmission to operative drive positions for selectively establishing the desired speed drive through the transmission, said speed selector valve comprising a fixed inner valve sleeve formed with a cylindrical outer periphery, said inner valve sleeve having a central fluid pressure chamber and a plurality of pressure passages communicating with said central pressure chamber and terminating in ports at the outer periphery of the inner valve sleeve having spaced locations axially and circumferentially thereon, a valve body formed with a cylindrical sleeve portion shaped to extend around said cylindrical periphery of said fixed inner sleeve and formed with an enlarged transverse flange, said valve body being formed with elongated passages which extend between ports at the inner radial face of the cylindrical sleeve portion of the valve body and ports at the flange on the valve body, said valve body also being formed with exhaust passages extending between the inner and outer radial faces of the cylindrical sleeve portion of the valve body, and an adjustable cylindrical valve sleeve snugly received between said cylindrical outer periphery of the fixed inner valve sleeve and the inner radial face of said cylindrical sleeve portion of the valve body, said adjustable valve sleeve being formed with a plurality of passages constructed and arranged to selectively register with said pressure passages in the fixed inner valve sleeve and certain of the ports at the inner radial face of said cylindrical sleeve portion of the valve body which lead to elongated passages in the valve body for passing fluid under pressure from said central pressure chamber in the fixed inner valve sleeve through elongated passages in the valve body, and said adjustable valve sleeve also being formed with a plurality of channels in its outer radial face constructed and arranged to effect communication between exhaust passages in the valve body and the others of said ports at the inner radial face of said cylindrical sleeve portion of the valve body which lead from the other elongated passages in the valve body for exhausting fluid from said other elongated passages in the valve body.

12. In an hydraulically controlled variable speed transmission apparatus of the character described, a plurality of shiftable drive elements for establishing different speed drives to a driven element, a cylinder block formed with a plurality of cylinder passages one for each of said drive elements, a piston in each cylinder passage connected with its drive element and movable back and forth in its said passage for shifting its drive element, each piston being formed with a reduced neck portion, the cylinder block having a transverse passage for each cylinder passage in a common plane intersecting said cylinder passages and intersecting each other, a ball located in each transverse passage adapted for movement therein into and out of engagement with the reduced neck portion of its related piston, and a floating locking member at the intersection of said transverse passages coacting with said balls in response to the movement of any one ball by the operation of its respective piston in a shifting operation to thereby lock the remaining balls in the reduced neck portions of their respective pistons to thereby lock the remaining pistons against operation.

13. An hydraulically controlled variable speed transmission apparatus as set forth in claim 12, in which the floating member is disposed in a chamber at the intersection of the transverse passages and the transverse passages emanate radially from said chamber.

14. An hydraulically controlled variable speed transmission apparatus as set forth in claim 12, including a single drive transmitting shaft, each of the shiftable drive elements being mounted on said shaft, and means for clutching each drive element to and declutching it from said shaft.

15. An hydraulically controlled variable speed transmission apparatus as set forth in claim 12, including a single drive transmitting shaft, the shiftable drive elements being four in number and mounted on said shaft axially spaced thereon, the floating element being disposed in a chamber at the intersection of the transverse passages and the transverse passages emanating radially from said chamber.

16. An hydraulically controlled variable speed transmission apparatus for machine tools or the like, comprising a transmission including a plurality of shiftable drive elements for establishing different speeds to a driven element, an additional shiftable drive element controlling the final connection of said transmission to the driven element for selectively connecting or disconnecting the transmission to the driven element, a multi-flow speed selector valve operative to control hydraulically the shifting of said plurality of shiftable drive elements for selectively establishing the desired speed drive through the transmission, and a manually controlled mechanism operative to control the shifting of said additional drive element, said mechanism comprising an hydraulically operated piston connected to said additional shiftable drive element to move the latter back and forth between two extreme positions in each of which to establish a different driving speed, and a manually operable rotary valve receiving its fluid pressure from said speed selector valve and operable when said additional shiftable drive element is in either said extreme position to return the latter element to a neutral non-drive transmitting position and at the same time to serve as an interlock to prevent the transmission of drive to the driven element in response to any selective setting of the speed selector valve.

17. An hydraulically controlled variable speed transmission apparatus for machine tools and the like as set forth in claim 16, in which the manually operable rotary valve is provided with cam members coacting with cam members on the additional shiftable drive element and said cam members are shaped to cause movement of the latter shiftable drive element from either of its extreme positions to a neutral position in response to manual movement of said rotary valve to the neutral position.

References Cited in the file of this patent

UNITED STATES PATENTS

| 882,091 | Balloco | Mar. 17, 1908 |
| 1,904,971 | Ernst et al. | Apr. 18, 1933 |
| 2,010,556 | Nenninger et al. | Aug. 6, 1935 |
| 2,012,081 | Nenninger et al. | Aug. 20, 1935 |
| 2,094,418 | Swanson | Sept. 28, 1937 |
| 2,124,507 | Hodgkins | July 19, 1938 |
| 2,457,876 | Derungs | Jan. 4, 1949 |
| 2,615,346 | Simpson et al. | Oct. 28, 1952 |